Oct. 18, 1927.
H. E. WARREN
SPEED REGULATOR
Filed Jan. 4, 1924
1,646,269
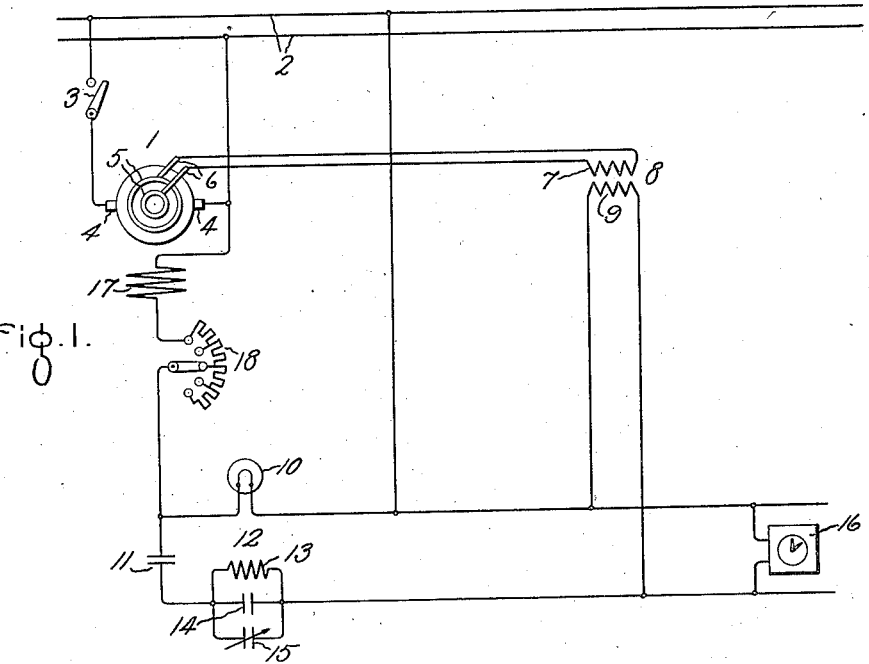
Fig. 1.
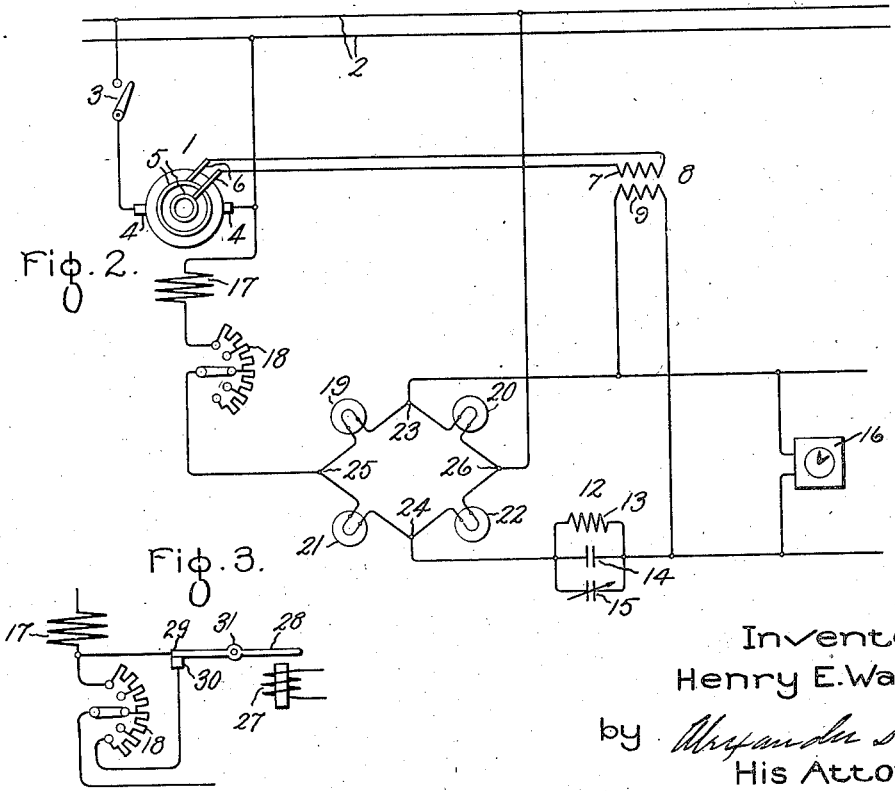
Fig. 2.
Fig. 3.
Inventor:
Henry E. Warren;
by *Alexander S. Lant*
His Attorney.

Patented Oct. 18, 1927.

1,646,269

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

SPEED REGULATOR.

Application filed January 4, 1924. Serial No. 684,459.

My invention relates to the speed control of dynamo electric machines, and especially to the control of machines which are required to be operated at constant speed or at speeds which change but slightly from a constant value.

In the operation of electric machines it is frequently desirable that the speed be maintained within narrow limits. Thus, for example, in the case of rotary converters or generators utilized to operate clocks or to supply current for use in wireless transmission systems it is of the utmost importance that considerable variations in speed be prevented. In accordance with my invention means resonant to a certain definite frequency are arranged to control the excitation and consequently the speed of the machine. In one embodiment of my invention this is accomplished by resistor means associated with the field circuit of the machine and controlled in response to the value of current in a tuned circuit upon which is impressed a voltage having a frequency which is proportional to the speed of the machine.

An object of my invention is to provide an improved speed regulating means operable in response to variation in the frequency of a voltage generated by the machine to control the machine speed. A further object is to provide an improved means by which the heating effect of one current of electricity may be utilized to control the value of another current of electricity.

My invention will be better understood on reference to the following description when considered in connection with the accompanying diagrammatic drawings and its scope will be pointed out by the appended claims.

Referring now to the drawing, Fig. 1 shows a speed control system in which my invention has been embodied; Fig. 2 shows my invention as applied in a modified form; and Fig. 3 shows a further modification.

Fig. 1 shows a rotary converter 1 operatively associated with the direct current line 2 through switch 3 and brushes 4. Connected to the slip rings 5 and brushes 6 of the converter 1 is the primary winding 7 of a transformer 8, the secondary winding 9 of which is arranged to impress an alternating voltage on a tuned circuit comprising a current controlling device 10, a condenser 11 for excluding direct current from the tuned circuit, and a filter 12 which consists of reactor 13, fixed condenser 14 and variable condenser 15 connected in parallel. A load device, illustrated as a clock 16, is shown as arranged to be supplied with current from the secondary winding 9 of the transformer 8. The shunt field winding 17 of the machine 1 is connected to the line 2 through a resistor 18 and temperature controlled resistance means illustrated as a lamp 10 which, it will be observed, is common to both the field circuit and the resonant circuit previously described.

Fig. 2 shows a modification of the invention by which the necessity of providing a stop condenser to exclude direct current from the resonant circuit is avoided. In accordance with this arrangement lamps 19, 20, 21 and 22 of equal capacity are arranged in a Wheatstone bridge circuit so that there is no tendency for direct current to pass into the resonant circuit because of the fact that points 23 and 24 are at the same potential. Points 25 and 26 are likewise points of equal potential and for this reason there is no possibility of alternating current getting into the field circuit of the machine. Like the lamp 10 in Fig. 1, lamps 19, 20, 21 and 22 are common to the field circuit and the tuned circuit.

Fig. 3 is a fragmentary view showing a modification suitable for use in connection with large machines. This modification comprises a solenoid having a coil 27 which may be connected to the resonant circuit shown by Figures 1 and 2 and which is arranged to operate a lever 28 pivoted at the point 31 through which contacts 29 and 30 are closed and opened to periodically short-circuit a part or all of the field resistor 18 for controlling the effective resistance of the field circuit and consequently the excitation of the machine 1.

Assuming the switch 3 to be in closed position and the machine 1 to be operated at a frequency below that for which the resonant circuit is tuned, alternating current will be supplied to the metal filament of the lamp 10, the resistance of this filament will be increased due to the heating effect of the alternating current, and the direct current supplied from the line 2 to the field winding 17 through the filament will be of comparatively low value. The torque of the machine 1 will therefore be low and it will increase its speed until the resonance frequency of the tuned circuit is reached when the filter 12 operates in well known manner to exclude alternating current from the lamp circuit. When this occurs the resistance of the lamp filament immediately decreases thereby permitting an increase in the excitation and torque of the machine 1 which slows down slightly and in doing so decreases the frequency of the voltage impressed on the tuned circuit. If perfect resonance were reached, the alternating current for heating the lamp filament would become practically negligible. This would of course tend to bring the speed of the machine far below that corresponding to resonance of the wave filter 12. Obviously a condition of equilibrium will be reached under which the filter 12 will permit sufficient current to pass through the lamp filament or other control device to maintain the shunt field at such a value as to give almost, but not quite, the speed corresponding with the free vibration of the filter. It is thus possible to regulate the speed of a machine having a shunt field to a high degree of accuracy because by proper choice of the wave filter and control lamp or other control device almost any desired degree of sensitiveness to extremely small fluctuations in speed may be obtained.

It is of course obvious that the controlling current need not pass through the lamp filament or other control means since the same effect may be produced by otherwise utilizing it to produce heat by which the effective resistance of the field circuit is controlled. I accordingly do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. A speed regulator for regulating the speed of a dynamo electric machine provided with a field winding arranged to be supplied with current for exciting said machine and with an armature winding having alternating current terminals, comprising means including a tuned circuit operatively associated with said alternating current terminals, and means conductively associated with said field winding and said tuned circuit for controlling the excitation of said machine in response to its speed.

2. A speed regulator for regulating the speed of a dynamo electric machine provided with a field winding arranged to be supplied with current for exciting said machine and with an armature winding having alternating current terminals, comprising means for controlling the current supplied to said field winding, and a tuned circuit conductively associated with said control means and said alternating current terminals for controlling the excitation of said machine, said field current control means being arranged to preclude the supply of current to said field winding and to said tuned circuit from a common source.

3. A speed regulator for regulating the speed of a dynamo electric machine provided with a field winding arranged to be supplied with current for exciting said machine and with an armature winding having alternating current terminals, comprising resistor means for controlling the current supplied to said field winding, and a tuned circuit operatively associated with said alternating current terminals for controlling the temperature of said resistor means in accordance with the frequency of the voltage impressed on said terminals.

4. A speed regulator for regulating the speed of a dynamo electric machine provided with a field winding arranged to be supplied with current for exciting said machine and with an armature winding having alternating current terminals, comprising resistor means arranged in a Wheatstone bridge circuit for controlling the current supplied to said field winding, and a tuned circuit operatively associated with said altenating current terminals for controlling the temperature of said resistor means in accordance with the frequency of the voltage impressed on said terminals.

5. A speed regulator for regulating the speed of a dynamo electric machine provided with a field winding arranged to be supplied with direct current for exciting said machine and with a generating winding having alternating current terminals, comprising resistor means for controlling the current supplied to said field winding, and a tuned circuit operatively associated with said alternating current terminals for controlling the temperature of said resistor means, said resistor means being arranged to exclude direct current from said tuned circuit.

6. A speed regulator for regulating the speed of a dynamo electric machine provided with a field winding arranged to be supplied with excitation from a source of direct current and with a generating winding having alternating current terminals, comprising resistor means arranged in a Wheatstone bridge circuit having one set of terminals connected to said direct current source in series with said field winding for controlling the current supplied to said field winding from said source, and a tuned circuit connected to said alternating current terminals in series with another set of the terminals of said Wheatstone bridge circuit for controlling the temperature of said resistor means in accordance with the frequency of the voltage generated by said machine.

7. The method of regulating the excitation of a dynamo electric machine provided with a field circuit comprising resistor means and an armature winding associated with a tuned circuit connected to said resistor means, which comprises controlling the temperature of said resistor means in accordance with the frequency of current delivered by said machine.

8. The method of regulating the excitation of a dynamo electric machine provided with a field circuit comprising resistor means and an armature winding associated with a tuned circuit connected to said resistor means, which comprises controlling said resistor means in accordance with the frequency of current delivered by said machine.

I witness whereof, I have hereunto set my hand this 27th day of December, 1923.

HENRY E. WARREN.